United States Patent [19]
Gann et al.

[11] Patent Number: 5,227,785
[45] Date of Patent: Jul. 13, 1993

[54] FREESTANDING VEHICLE PARKING ASSIST APPARATUS

[76] Inventors: William S. Gann, 8615 E. Burnside, Portland, Oreg. 97216; John G. Harris, 16246 SE. Rayna Ct., Milwaukie, both of Oreg. 97267

[21] Appl. No.: 806,020

[22] Filed: Dec. 9, 1991

[51] Int. Cl.$^5$ .............................................. B60Q 1/48
[52] U.S. Cl. ................................. 340/932.2; 340/436; 116/203; 200/61.41
[58] Field of Search ...................... 340/932.2, 687, 436, 340/437; 116/28 R, 202, 203, 28 A; 200/61.44, 61.42, 61.41, 61.43

[56] References Cited

U.S. PATENT DOCUMENTS

| | | | |
|---|---|---|---|
| 2,879,350 | 3/1959 | Howell | 340/932.2 |
| 3,621,807 | 11/1971 | Kang | 116/28 |
| 3,922,638 | 11/1975 | Mendelsohn | 340/932.2 |
| 4,036,165 | 7/1977 | Wood | 116/28 R |
| 4,101,868 | 7/1978 | Bubnich et al. | 340/51 |
| 4,237,446 | 12/1980 | Roberts | 340/436 |
| 4,965,571 | 10/1990 | Jones | 340/932.2 |

*Primary Examiner*—Bonnie L. Crosland
*Attorney, Agent, or Firm*—John R. Flanagan

[57] ABSTRACT

Vehicle parking assist apparatus includes a hollow mounting base, an elongated signaling device, such as an upright pole having a signal light mounted thereto, supported on the base for pivotal movement from a normal upright non-signaling position to a tilted signaling position upon being contacted by an advancing vehicle, and an electrical circuit connected to the signal light of the elongated signaling device and capable of being switched from an open circuit condition to a closed circuit condition for electrically actuating the signal light to provide a visible alerting signal for a driver of the advancing vehicle. A coupling device supports the pole upright on the base and also couples the signal light to the electrical circuit. The coupling device is capable of retaining the electrical circuit in an open circuit condition so long as the signaling device is disposed in the upright non-signaling position. The coupling device is further capable of switching the electrical circuit to the closed circuit condition in response to the elongated signaling device being contacted and tilted by the advancing vehicle to the tilted signaling position.

20 Claims, 2 Drawing Sheets

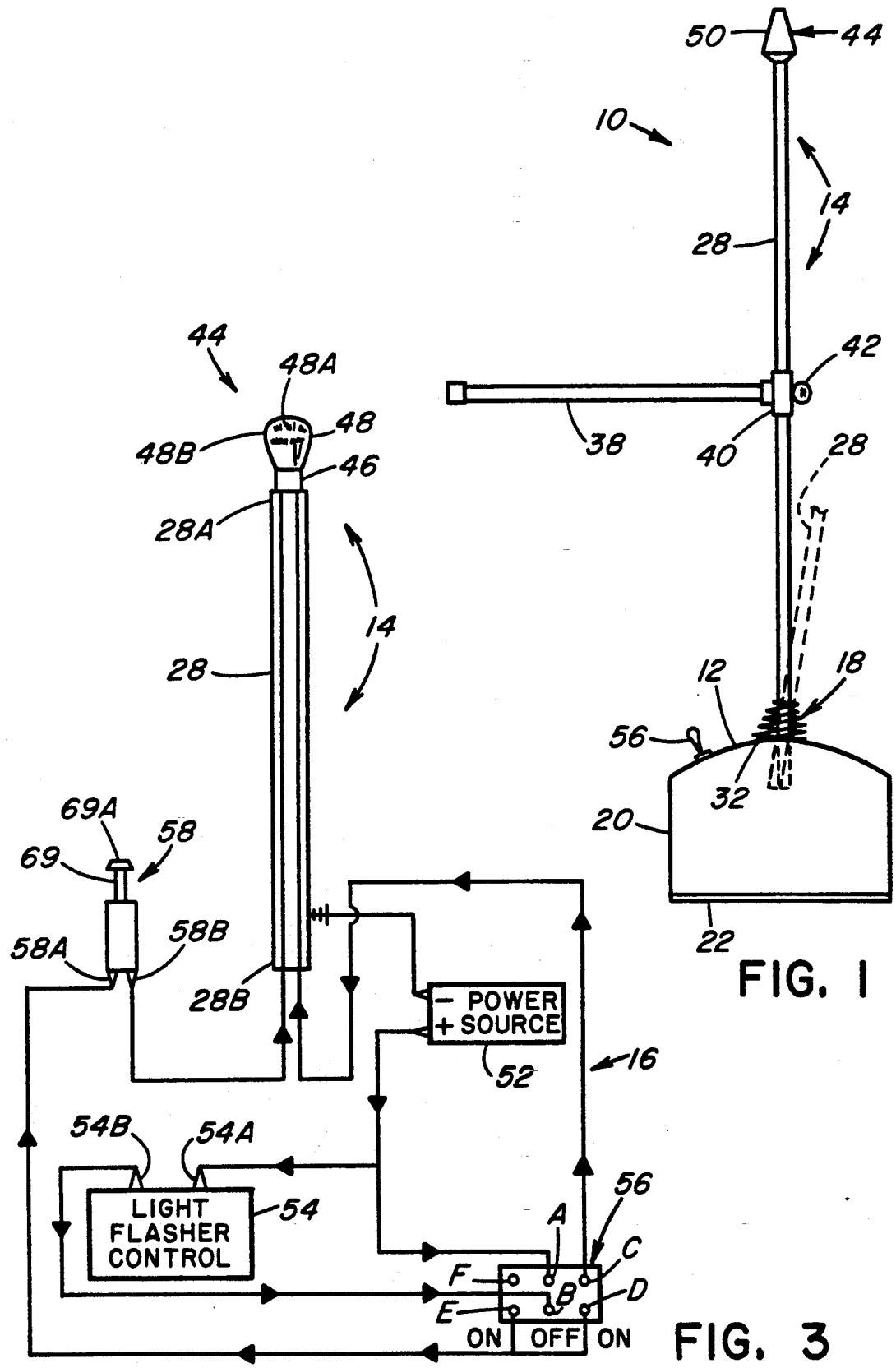

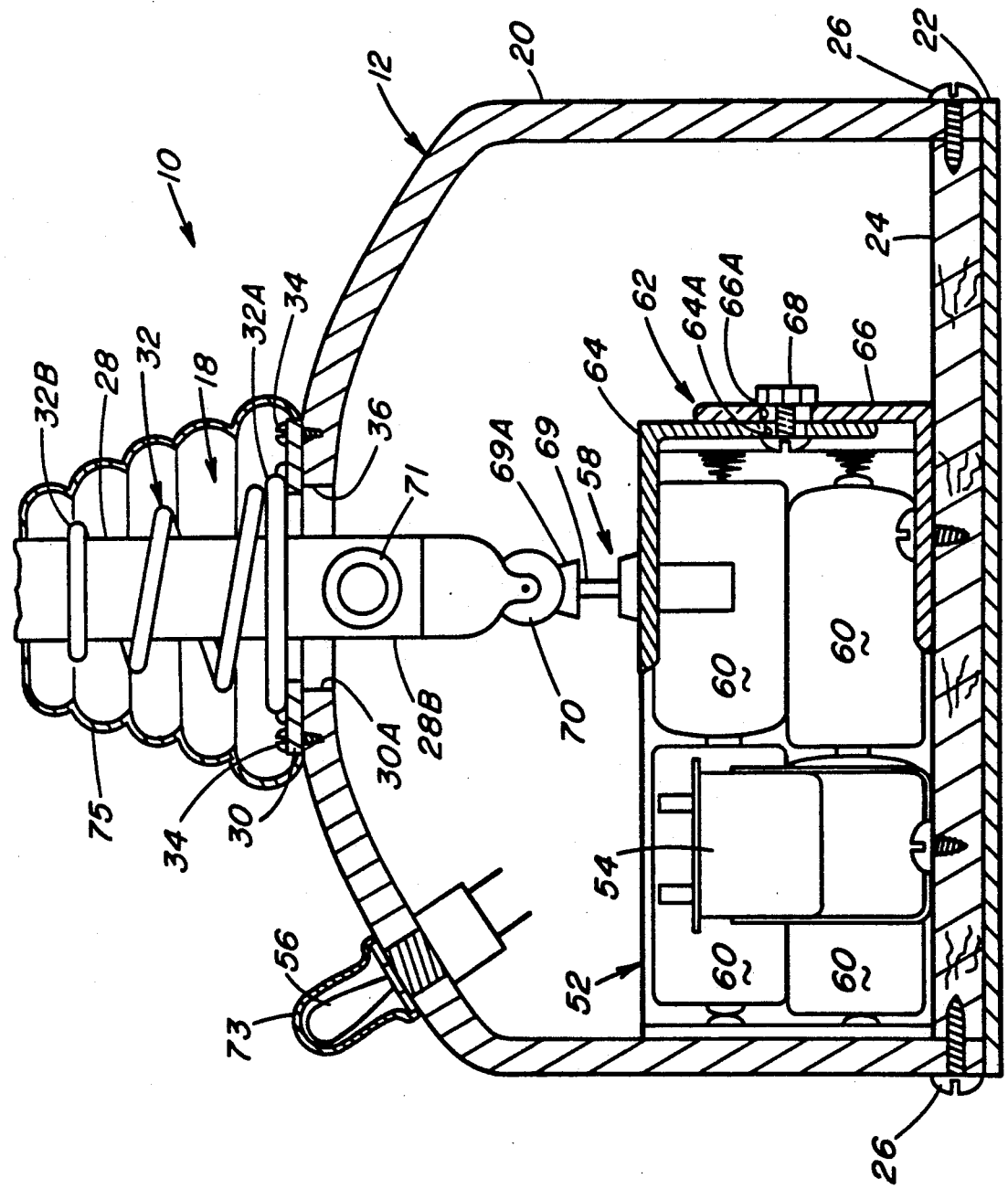

FREESTANDING VEHICLE PARKING ASSIST APPARATUS

BACKGROUND OF THE INVENTION

1. Field of the Invention

The present invention generally relates to vehicle parking and, more particularly, is concerned with a freestanding parking assist apparatus particularly useful in backup parking of large vehicles, such as pickups, campers, boat trailers, and recreational vehicles (RVs).

2. Description of the Prior Art

Parking a vehicle typically involves both forward and backing movements to maneuver the vehicle into the desired area. Backing can be a particuarly difficult task with large vehicles, such as campers and RVs, because of limited visibility from the driver's seat to behind the vehicle.

Many devices have been proposed in the prior patent art to assist in backing vehicles into designated positions within a parking area. Representative of the prior art are the devices disclosed in U.S. Pat. No. 3,621,807 to Kang, U.S. Pat. No. 4,036,165 to Wood, U.S. Pat. No. 4,101,868 to Bubnich et al, and U.S. Pat. No. 4,965,571 to Jones. While many of these devices probably function satisfactorily under the limited conditions for which they were designed, they seem to lack adaptability to a wide range of conditions of use. The devices require a vertical structure, such as a wall, near the parking area to which to mount the device. Also, some of the devices are limited to operation during daylight conditions.

Consequently, a need exists for a vehicle parking assist apparatus which is more versatile and avoids the above-mentioned limitations of prior art devices.

SUMMARY OF THE INVENTION

The present invention provides a freestanding vehicle parking assist apparatus designed to satisfy the aforementioned needs. The vehicle parking assist apparatus of the present invention is particularly useful in backing large vehicles, such as pickups, campers, boat trailers, and recreational vehicles (RVs). The apparatus is freestanding, battery-operated, and portable so that it can be employed in a wide range of parking environments. Also, the apparatus is adapted for both daytime and nighttime operation.

Accordingly, the present invention is directed to a vehicle parking assist apparatus which comprises: (a) a mounting base; (b) an elongated signaling device supported on the base for pivotal movement from an upright non-signaling position to a tilted signaling position upon being contacted by an advancing vehicle; (c) an electrical circuit coupled to the elongated signaling device and capable of being switched from an open circuit condition to a closed circuit condition for electrically actuating the signaling device to provide an alerting signal for a driver of the advancing vehicle; and (d) means for coupling the signaling device to the electrical circuit and supporting the signaling device on the base, the coupling means being capable of retaining the electrical circuit in the open circuit condition as long as the elongated signaling device is disposed in the upright non-signaling position and of switching the electrical circuit to the closed circuit condition in response to the elongated signaling device being moved to the tilted signaling position.

More particularly, the elongated signaling device includes an elongated pole, a signal light mounted to an upper end of the pole, and an arm adjustably attached to the pole and extending transversely therefrom. The coupling means includes a resiliently flexible spring supporting the pole of the signaling device for pivotal movement between an upright non-signaling position and a tilted signaling position. The mounting base has a top opening and the coupling device is a coil spring surrounding the pole immediately above a lower end of the pole which extends downwardly through the top opening of the base. The coil spring at a lower end is rigidly attached to the base and at an upper end is rigidly attached to the pole so as to support the pole normally in the upright non-signaling position while permitting pivotal movement of the pole toward a tilted signaling position upon the signaling device arm being contacted by the advancing vehicle.

Further, the electrical circuit includes an electrical power source, a light flasher control, an operating mode switch, and an actuating switch, with the power source, light flasher control and actuating switch being disposed in the base and electrically connected to the mode switch which is mounted on the exterior of the base. The mode switch at least has "on" and "off" positions. The actuating switch has a reciprocal plunger movable between a depressed position for switching the electrical circuit to the open circuit condition, and an extended position for switching the electrical circuit to the closed circuit position when the mode switch is disposed in an "on" position. The lower end of the pole of the signaling device which extends into the base has an engaging member rotatably mounted thereon which is operable to depress the plunger when the pole is disposed in the upright non-signaling position and to release the plunger when the pole is pivoted to the tilted signaling position.

These and other features and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the following detailed description, reference will be made to the attached drawings in which:

FIG. 1 is a front elevational view of a vehicle parking assist apparatus of the present invention.

FIG. 2 is an enlarged, partly sectional, view of a base of the vehicle parking assist apparatus of FIG. 1.

FIG. 3 is a wiring diagram of an electrical circuit employed by the vehicle parking assist apparatus.

DETAILED DESCRIPTION OF THE INVENTION

Referring to the drawings, and particularly to FIG. 1, there is illustrated a freestanding vehicle parking assist apparatus, generally designated 10, of the present invention. The vehicle parking assist apparatus 10 can be used to assist in parking large vehicles. The apparatus 10 can be used most advantageously for both daytime and nighttime backup parking of large vehicles, such as pickups, campers, boat trailers, and recreational vehicles, but is not limited to such use.

As seen in FIGS. 1-3, the vehicle parking assist apparatus 10 basically includes a freestanding hollow mounting base 12, an elongated signaling device 14, an electrical circuit 16, and a device 18 for coupling the electrical circuit 16 to the elongated signaling device 14 and for supporting the signaling device 14 upon the base 12. The elongated signaling device 14 of the apparatus 10 is supported on the base 12 by the coupling device 18 for pivotal movement from an upright non-signaling position, shown in solid line form in FIG. 1, to a tilted signaling position, shown in dashed line form in FIG. 1, upon being contacted by an advancing vehicle.

The electrical circuit 16 of the apparatus 10 is coupled to the elongated signaling device 14. The circuit 16 also is capable of being switched from an open circuit condition to a closed circuit condition for electrically actuating the elongated signaling device 14. In response to being actuated, the signaling device 16 provides an alerting signal for a driver of a vehicle advancing, such as by backing up, toward a particular position, such as a designated parking area.

The coupling device 18 of the apparatus 10 supports the signaling device 16 on the base 12 and also is capable of retaining the electrical circuit 16 in an open circuit condition as long as the elongated signaling device 16 remains disposed in the upright non-signaling position. The coupling device 18 further is capable of switching the electrical circuit 16 to the closed circuit condition in response to elongated signaling device 14 being moved to the tilted signaling position.

Referring to FIGS. 1 and 2, the mounting base 12 of the apparatus 10 takes the form of a housing 12 composed of hollow cap 20 and a bottom plate 22. Also, a base platform 24 is disposed within the cap 20 and upon the bottom plate 22. The base plate 24 is attached to the interior lower peripheral edge of the cap 20 by fastener screws 26. As examples, the cap 20 can be fabricated from a suitable plastic such as P.V.C., the bottom plate 22 made of aluminum, and the base plate 24 made of plywood.

As illustrated in FIGS. 1-3, the elongated signaling device 14 of the apparatus 10 includes an elongated pole 28 mounted upon the hollow cap 20 of the base 12 by the coupling device 18. The coupling device 18 of the apparatus 10 includes a mounting plate 30 in the form of an annular washer 30, and a resiliently flexible coil spring 32. The annular washer 30 is rigidly attached by fastener screws 34 about a top opening 36 in the base cap 20. The annular washer 30 has a central opening 30A disposed above and aligned with the top opening 36 in the base cap 20. As examples, the pole 28 can be a tube made of aluminum and the annular washer 30 and coil spring 32 can be made of stainless steel.

Referring to FIG. 1, the signaling device 14 also includes an arm 38 adjustably attached to the elongated vertical pole 28 and extending horizontally, or transversely, therefrom. The arm 38 is mounted to a T-shaped fitting 40 which is slidable longitudinally on the elongated pole 28 to change the position of the arm 38. A thumb screw 42 is releasably threaded into the fitting 40 for making contact with the pole 28 to fasten and retain the fitting 40 and thereby the arm 38 at a desired height above the base 12. As examples, the arm 38 can be a tube made of aluminum and fitting 40 can be made of aluminum.

As shown in FIGS. 1 and 3, the signaling device 14 further includes a signal light 44 installed in a socket 46 mounted to an upper end 28A of the pole 28. The light 44 includes a bulb 48 electrically grounded to the pole 28 and enclosed in a weather resistant translucent cap 50. Preferably, the bulb 48 has two filaments 48A, 48B for permitting two-way operation.

Referring to FIG. 2, the flexible coil spring 32 of the coupling device 18 encircles the elongated pole 28 immediately above a lower end 28B of the pole 28 which extends downwardly through the top opening 36 in the base cap 20. At a lower end 32A the spring 32 is rigidly attached to the annular washer 30, while at an upper end 32B the spring 32 is attached to the pole 28 so as to support the pole 28 in an upright orientation with its lower end 28B extending downwardly through the top opening 36 in the base cap 20. In such manner, the flexible coil spring 32 supports the elongated pole 28 for pivotal movement between the upright non-signaling position, shown in solid line form in FIG. 1, and the tilted signaling position, shown in dashed line form in FIG. 1. The diameters of the central opening 30A in the annular washer 30 and the top opening 36 in the base cap 20 are sufficiently larger than the diameter of the pole 28 so as to allow the pole 28 to pivot or tilt away from the upright non-signaling position without contacting the annular washer 30 nor the base cap 20.

As illustrated in FIGS. 2 and 3, the electrical circuit 16 of the appartus 10 includes an electrical power source 52, a light flasher control 54, operating mode switch 56, and an actuating switch 58. The power source 52, light flasher control 54 and actuating switch 58 are housed in the base 12. The mode switch 56 is mounted on the exterior of the base cap 20 and connected to the power source 52, flasher control 54, actuating switch 58 and the nightlight filament 48A of the signal light bulb 48. The power source 52 is preferably composed of a plurality of D.C. batteries 60, for example a total of eight "C" size batteries to provide twelve volts of D.C. current. The negative terminal of the power source 52 is grounded by the pole 26. The light flasher control 54 is, for example, a twelve volt automotive-type flasher unit.

The mode switch 54 is an electric, three-position (on-off-on), six-contact or terminal, switch for independently controlling power to the nightlight filament 48A of the signal light bulb 48 and to the flasher control 54 for operating the flasher light filament 48B of the signal light bulb 48. The actuating switch 58 is a plunger-type electric switch mounted on a bracket 62 which, in turn, is mounted upright on the base plate 24 of the base 20. The bracket 62 includes upper and lower members 64, 66, for example in the form of a pair of aluminum angle pieces, having respective aligned slots 64A, 66A for receiving a fastening bolt 68 permitting the upper member 64 to be adjusted vertically with respect to the lower member 66 and then secured at the desired position. The adjustable bracket 62 thereby permits positioning the actuating switch 58 such that its reciprocal plunger 69 is depressed the desired amount by a roller wheel 70 rotatably mounted to the lower end 28B of the pole 28 to maintain actuating switch 58 in an "off" condition when the pole 28 is disposed in the upright non-signaling position. The wheel 70 will roll off the plunger head 69A, permitting it to extend sufficiently for actuating the switch 58 to an "on" condition, as the pole 28 is moved from the upright non-signaling position to the tilted signaling position. The wheel 68 will roll back on the plunger head 69A, depressing the plunger 69 and returning the switch 58 to the "off" condition, as the pole 28 is returned from the tilted to upright position by the return biased force of the coil spring 32 imposed on the pole 28. Also, a rubber grommet 71 is mounted through a hole in the lower end 28B of the pole 28 to provide a port for conductor wires to the signal light 44 (not shown in FIG. 2) to enter the pole 28.

As shown in FIG. 3, the operating mode switch 56 has terminals A through F. Terminal A of the mode switch 56 is connected to the positive terminal of the power source 52. The positive terminal of the power source 52 is also connected to one terminal 54A of the light flasher control 54. Terminal B of the mode switch 56 is connected to the other terminal 54B of the light flasher control 54. Terminal C of the mode switch 56 is connected to the nightlight filament 48A of the light bulb 48. Terminal D of the mode switch 56 is connected to one terminal 58A of the actuating switch 58. The other terminal 58B of the actuating switch 58 is connected to the flasher light filament 48B of the signal light bulb 48. Terminal E of the mode switch 56 is also connected to the one terminal 58A of the actuating switch 58. Terminal F of the mode switch 56 is not connected.

As mentioned earlier, the operating mode switch 56 is a three-position, on-off-on switch. As seen in FIG. 3, in a right "on" position of the mode switch 56, terminals A and C are connected and terminals B and D are connected. This is the position of the mode switch 56 for nighttime operation wherein the nightlight filament 48A of the signal light bulb 48 is continuously illuminated and the flasher light filament 48B of the bulb 48 will be turned on to flash repetitively whenever the arm 38 of the pole 28 is engaged by an advancing vehicle so as to tilt the pole 28 sufficiently to roll the wheel 70 off the plunger 69 of the actuating switch 58. In a left "on" position of the mode switch 56, terminals B and E are connected for daytime operation wherein only the flasher light filament 48B of the signal light bulb 48 will be turned on to flash repetitively whenever the pole 28 is sufficiently tilted by an advancing vehicle. The nightlight filament 48A of the signal light bulb 48 remains turned off due to the terminals A and C being disconnected. In a middle "off" position of the mode switch 56, none of the terminals are connected and so the power supply 52 is disconnected from the signal light bulb 48 and the actuating switch 58.

The freestanding vehicle parking assist apparatus 10 is used, such as in assisting the backing of a vehicle, by being placed behind the vehicle at the desired backup stopping point. Preferably, the apparatus 10 is placed at the rear corner of the vehicle on the driver's side. The arm 38 is adjusted to preferably match the height of the vehicle bumper. The mode switch 56, which is normally in the middle or center "off" position, is then placed either in the right "on" position for use after dark or in the left "on" position for use during daylight hours. Note that in either mode the signal light 44 will begin flashing when the actuating switch 58 is activated to the "on" condition. The driver then begins to slowly backup the vehicle toward the desired backup stopping point. When the corner of the vehicle bumper contacts and pushes against the arm 38 to tilt the pole 28 the required amount, the actuating switch 58 is activated from the "off" to "on" condition causing the signal light 44 is start flashing which alerts the driver to stop.

The apparatus 10 is of sufficient weight to resist being moved when the arm 38 is contacted by the vehicle bumper. The freestanding nature, battery operation, and portability of the apparatus 10 permits it to be used in a wide variety of terrain conditions. It should be noted that the signaling device 14 can employ an audible alarm as opposed to a visible light. In such case, the alarm and a one-way light bulb would be substituted for the two-way bulb 48. Further, it should be understood that the two-way light bulb 48 could be replaced by a one-way bulb where use of the apparatus 10 at night is not anticipated. Also, flexible rubber boots 73, 75 are provided to seal the apparatus 10 from infiltration by moisture, such as water. The small boot 73 covers and seals around the mode switch 56, whereas the large boot 75 covers and seals around the coil spring 32, lower end of the pole 32B, and top opening 36 in the base cap 30.

It is thought that the present invention and its advantages will be understood from the foregoing description and it will be apparent that various changes may be made thereto without departing from its spirit and scope of the invention or sacrificing all of its material advantages, the form hereinbefore described being merely preferred or exemplary embodiment thereof.

Having thus described the invention, what is claimed is:

1. Vehicle parking assist apparatus, comprising:
   (a) a mounting base;
   (b) an elongated signaling device supported on said base for pivotal movement from an upright non-signaling position to a tilted signaling position upon being contacted by an advancing vehicle;
   (c) an electrical circuit coupled to said elongated signaling device and capable of being switched from an open circuit condition to a closed circuit condition for electrically actuating said signaling device to provide an alerting signal for a driver of the advancing vehicle; and
   (d) means for coupling said signaling device to said electrical circuit and supporting said signaling device on said base, said coupling means being capable of retaining said electrical circuit in said open circuit condition as long as said elongated signaling device is disposed in said upright non-signaling position and of switching said electrical circuit to said closed circuit condition in response to said elongated signaling device being moved to said tilted signaling position;
   (e) said signaling device including an elongated hollow pole extending upwardly from said base and an electrical signaling element mounted to an upper end portion of said pole and being operable for providing said alerting signal, said electrical circuit including a portion extending through said pole and connected to said electrical signaling element.

2. The apparatus of claim 1 wherein said mounting base is a hollow housing formed by a hollow cap and a bottom plate attached to the lower edge of the cap.

3. The apparatus of claim 1 wherein:
   said electrical signaling element is a signal light mounted to said upper end portion of said pole; and
   said signaling device also includes an arm adjustably attached to said pole and extending transversely therefrom for contact by the advancing vehicle to pivotally move said pole from said upright non-signaling position to said tilted signaling position.

4. The apparatus of claim 3 wherein said signal light includes a socket mounted to said pole and a bulb installed in said socket.

5. The apparatus of claim 4 further comprising: a weather resistant translucent cap enclosing said bulb.

6. The apparatus of claim 1 wherein said coupling means includes a resiliently flexible spring supporting said signaling device for pivotal movement between an upright non-signaling position and a tilted signaling position.

7. The apparatus of claim 1 wherein:
said mounting base has a top opening; and
said coupling means is a coil spring surrounding said pole immediately above a lower end of said pole extending downwardly through said top opening of said base, said spring at a lower end being rigidly attached to said base and at an upper end being rigidly attached to said pole so as to support said pole normally in said upright non-signaling position and for pivotal movement toward said tilted signaling position upon said signaling device being contacted by the advancing vehicle.

8. Vehicle parking assist apparatus, comprising:
(a) an enclosed mounting base having a hollow interior and a top opening;
(b) an elongated signaling device including an elongated member having a lower end portion extending downward through said top opening of said enclosed mounting base, said elongated member being supported on said base for pivotal movement from an upright non-signaling position to a tilted signaling position upon being contacted by an advancing vehicle;
(c) an electrical circuit disposed in said interior of said enclosed mounting base and coupled to said lower end portion of said elongated member of said signaling device and capable of being switched from an open circuit condition to a closed circuit condition for electrically actuating said signaling device to provide an alerting signal for a driver of the advancing vehicle; and
(d) means for coupling said signaling device to said electrical circuit and supporting said elongated member of said signaling device on said base, said coupling means being capable of retaining said electrical circuit in said open circuit condition as long as said elongated signaling device is disposed in said upright non-signaling position and of switching said electrical circuit to said closed circuit condition in response to said elongated signaling device being moved to said tilted signaling position;
(e) said coupling means including a coil spring surrounding said elongated member immediately above said lower end portion thereof extending downwardly through said top opening of said enclosed base, said coil spring at a lower end being rigidly attached to said enclosed base and at an upper end being rigidly attached to said elongated member so as to support said elongated member normally in said upright non-signaling position and for pivotal movement toward a tilted signaling position upon being contacted by the advancing vehicle;
(f) said coupling means also including a flexible boot installed over said coil spring and sealably covering said coil spring and said top opening in said enclosed base so as to prevent entry of moisture through said top opening into said enclosed base to said electrical circuit.

9. The apparatus of claim 8 wherein said electrical circuit includes an electrical power source, a light flasher control, an operating mode switch, and an actuating switch, said power source, light flasher control and actuating switch being disposed in said interior of said enclosed base.

10. The apparatus of claim 9 wherein said mode switch is mounted on the exterior of said base and is connected to said power source, flasher control, actuating switch and said signaling device.

11. The apparatus of claim 10 wherein said elongated member is an elongated pole having a signal light mounted to an upper end of said pole.

12. The apparatus of claim 11 wherein said signal light is a two-way light with first and second filaments.

13. The apparatus of claim 9 wherein said mode switch is a three-position on-off-on switch independently connected to said first and second filaments of said signal light for supplying power to said first filament of said signal light independent of said second filament for operating said first filament continuously as a nightlight and for supplying power to said second filament of said signal light independent of said first filament.

14. The apparatus of claim 9 wherein:
said mode switch at least has "on" and "off" positions; and
said actuating switch has a reciprocal plunger movable between a depressed position for switching said electrical circuit to the open circuit condition and an extended position for switching said circuit to the closed circuit position when said mode switch is disposed in an "on" position.

15. The apparatus of claim 14 wherein said signaling device has a lower end and an engaging member rotatably mounted on said lower end of said signaling device, said engaging member being operable to depress said plunger when said pole is disposed in said upright non-signaling position and to release said plunger when said pole is pivoted to said tilted signaling position.

16. The apparatus of claim 11 wherein said mode switch has a plurality of terminals, a first of said terminals being connected to said power source, a second of said terminals being connected to said light flasher control, a third of said terminals being connected to said signal light, and a fourth of said terminals being connected to said actuating switch.

17. Vehicle parking assist apparatus, comprising:
(a) a freestanding mounting base having a hollow interior and a top opening;
(b) an elongated signaling device supported on said base for pivotal movement from an upright non-signaling position to a tilted signaling position upon being contacted by an advancing vehicle, said signaling device including an elongated pole having a lower end extending through said top opening into said hollow interior of said base, a signal light mounted to an upper end of said pole, and an arm adjustably attached to said pole and extending transversely therefrom for contact by the advancing vehicle to pivotally move said pole from said upright non-signaling position to said tilted signaling position;
(c) an electrical circuit coupled to said elongated signaling device and including an actuating switch capable of being switched from an open circuit condition to a closed circuit condition for electrically actuating said signal light of said signaling device to provide an alerting signal for a driver of the advancing vehicle, said actuating switch being disposed in said hollow interior of said base below said lower end of said pole of said signaling device and having a reciprocal plunger movable between a depressed position for switching said electrical circuit to said open circuit condition and an extended position for switching said electrical circuit to said closed circuit position;

(d) means for supporting said signaling device on said base with said lower end thereof extending downwardly through said top opening thereof, said coupling means including a resiliently flexible coil spring normally supporting said pole and thus said lower end thereof in said upright non-signaling position and permitting pivotal movement of said pole and thus said lower end thereof to said tilted signaling position;

(e) means for coupling said lower end of said pole of said signaling device to said actuating switch of said electrical circuit, said coupling means including a rotatable engaging member mounted to said lower end of said pole of said signaling device and being operable to depress said plunger when said pole and thus said lower end thereof are disposed in said upright non-signaling position and to release said plunger when said pole and thus said lower end thereof are pivoted to said tilted signaling position whereby said rotatable engaging means and actuating means are cooperable to retain said electrical circuit in said open circuit condition as long as said pole of said signaling device is disposed in said upright non-signaling position and to switch said electrical circuit to said closed circuit condition in response to said pole being moved to said tilted signaling position.

18. The apparatus of claim 17 wherein:
said coil spring surrounds said pole of said signaling device above said lower end of said pole which extends downwardly through said top opening of said base, said coil spring at a lower end being rigidly attached to said base and at an upper end being rigidly attached to said pole so as to support said pole normally in said upright non-signaling position while permitting pivotal movement of said pole toward said tilted signaling position upon said signaling device arm being contacted by the advancing vehicle.

19. The apparatus of claim 17 wherein said electrical circuit an electrical power source, a light flasher control, an operating mode switch, and an actuating switch, said power source, light flasher control and actuating switch being electrically connected to said mode switch, said mode switch at least having "on" and "off" positions.

20. The apparatus of claim 17 wherein said engaging member is a wheel rotatably mounted to said lower end of said pole and capable of rolling off of and onto said plunger of said actuating switch.

* * * * *